US010133110B2

(12) United States Patent
Cho et al.

(10) Patent No.: US 10,133,110 B2
(45) Date of Patent: Nov. 20, 2018

(54) COLOUR PURITY IMPROVEMENT FILM FOR LIQUID CRYSTAL DISPLAY DEVICE AND LIQUID CRYSTAL DISPLAY DEVICE HAVING SAME

(71) Applicant: SKC HI-TECH & MARKETING CO., LTD., Chungcheongnam-Do (KR)

(72) Inventors: Hong Youl Cho, Chungcheongnam-do (KR); Kyoo Choong Cho, Gyeonggi-do (KR); Hyun Cheol Nam, Chungcheongnam-do (KR); Sue Yoen Lee, Busan (KR)

(73) Assignee: SKC HI-TECH & MARKETING CO., LTD., Chungcheongnam-Do (KR)

( * ) Notice: Subject to any disclaimer, the term of this patent is extended or adjusted under 35 U.S.C. 154(b) by 0 days.

(21) Appl. No.: 15/516,881

(22) PCT Filed: Apr. 10, 2015

(86) PCT No.: PCT/KR2015/003058
§ 371 (c)(1),
(2) Date: Apr. 4, 2017

(87) PCT Pub. No.: WO2016/056716
PCT Pub. Date: Apr. 14, 2016

(65) Prior Publication Data
US 2017/0205646 A1    Jul. 20, 2017

(30) Foreign Application Priority Data
Oct. 6, 2014    (KR) .................... 10-2014-0134098

(51) Int. Cl.
G02F 1/1335    (2006.01)
C09K 19/60    (2006.01)
(Continued)

(52) U.S. Cl.
CPC ............ *G02F 1/1335* (2013.01); *C09K 19/60* (2013.01); *G02B 5/003* (2013.01); *G02F 1/1336* (2013.01);
(Continued)

(58) Field of Classification Search
CPC ....... C09K 19/60; G02B 5/003; G02F 1/1335; G02F 1/1336; Y10T 428/1041
See application file for complete search history.

(56) References Cited

U.S. PATENT DOCUMENTS

2008/0157025 A1*    7/2008    Fritzsche ............. C07D 487/04
                                                     252/403
2008/0232120 A1    9/2008    Kim et al. .................... 362/382
(Continued)

FOREIGN PATENT DOCUMENTS

JP    2003036033 A    *    2/2003
JP    2006-076240        3/2006    ............. B32B 27/30
(Continued)

OTHER PUBLICATIONS

International Search Report (ISR) dated Jul. 1, 2015 in PCT/KR2015/003058 published as WO 2016/056716 with English Translation.
(Continued)

*Primary Examiner* — Sophie Hon
(74) *Attorney, Agent, or Firm* — Harness, Dickey & Pierce, P.L.C.

(57) ABSTRACT

The present invention relates to a color purity improvement film (a color gamut enhancing film) that can improve the color purity of a liquid crystal display device, and a liquid crystal display device having the same. According to the present invention, a liquid crystal display device that blocks unnecessary wavelengths other than RGB wavelengths so as to improve color gamut and color purity may be provided by introducing a combination of dyes that absorb a particular
(Continued)

Wavelength band to the inside of an adhesion layer or a coating layer of a as liquid crystal display device.

5 Claims, 8 Drawing Sheets

(51) Int. Cl.
    *G02B 5/00* (2006.01)
    *G02F 1/13357* (2006.01)
(52) U.S. Cl.
    CPC .... *G02F 1/133509* (2013.01); *G02F 2202/28* (2013.01); *Y10T 428/1041* (2015.01)

(56) References Cited

U.S. PATENT DOCUMENTS

| | | | | |
|---|---|---|---|---|
| 2009/0002620 | A1* | 1/2009 | Yamashita | C08F 297/026 349/137 |
| 2010/0141859 | A1 | 6/2010 | Park et al. | 349/39 |
| 2013/0162933 | A1* | 6/2013 | Hou | G02F 1/133528 349/65 |

FOREIGN PATENT DOCUMENTS

| | | | | |
|---|---|---|---|---|
| JP | 2006251076 A | * | 9/2006 | C09B 53/00 |
| JP | 2008-243814 | | 10/2006 | F21V 8/00 |
| JP | 2009-251511 | | 10/2009 | G02B 5/22 |
| JP | 2009251511 A | * | 10/2009 | |
| JP | 2009-258225 | | 11/2009 | G02B 5/30 |
| JP | 2010-090056 | | 4/2010 | A61K 8/27 |
| JP | 2010-134349 | | 6/2010 | G02F 1/1335 |
| JP | 2011039093 A | * | 2/2011 | |
| JP | 2011-197617 | | 10/2011 | G02B 5/30 |
| JP | 2012-194522 | | 10/2012 | G02B 5/22 |
| JP | 2013-129701 | | 7/2013 | C09J 133/00 |
| KR | 10-2005-0065830 | | 6/2005 | G02F 1/1335 |
| KR | 10-2009-0005770 | | 1/2009 | G02B 5/30 |
| KR | 10-2010-0064215 | | 6/2010 | G02F 1/1335 |

OTHER PUBLICATIONS

Written Opinion (WO) dated Jul. 1, 2015 in PCT/KR2015/003058 published as WO 2016/056716 (no English translation available).

* cited by examiner

Example 1-3

Example 3-1

COLOUR PURITY IMPROVEMENT FILM FOR LIQUID CRYSTAL DISPLAY DEVICE AND LIQUID CRYSTAL DISPLAY DEVICE HAVING SAME

CROSS-REFERENCE TO RELATED APPLICATIONS

This application is a national phase application of PCT Application No. PCT/KR2015/003058, filed on Apr. 10, 2015, which claims the benefit and priority of Korean Patent Application No. 10-2014-0134098, filed Oct. 6, 2014. The entire disclosures of the applications identified in this paragraph are incorporated herein by reference.

FIELD

The present invention relates to a colour purity improvement film (color gamut enhancing film) for a liquid crystal display and a liquid crystal display comprising same.

BACKGROUND

In the past, 40-inch (") class TVs were mainstream products, but many consumers now buy 50" class TVs and even 60" class TVs. When the size competition was over, resolution competition began. Even a year ago, full high definition (HD) (FHD) class TVs belonged to an advanced model, but ultra HD (UHD) TVs now have been rapidly spread on the market.

Recently, the display market has evolved from large-area, high-resolution competition to color competition. For this reason, competition for the production of a display with excellent color has recently emerged.

A liquid crystal display (a liquid crystal display device) displays an image using optical properties of liquid crystals, wherein, since a liquid crystal panel displaying the image is a non-emissive device which is not self-luminous, the liquid crystal display has a structure including the liquid crystal panel as well as a back-light unit which is disposed on a rear surface of the liquid crystal panel to provide light to the liquid crystal panel.

A liquid crystal display has advantages of a small thickness, a light weight, a small consuming power and a low driving voltage when compared to other displays. On the contrary, the liquid crystal display is one step behind the other displays in the sense of color. The color reproduction range of a cathode ray tube (CRT) which is now disappearing is up to NTSC 80%, and a product of a plasma display panel (PDP) up to the level of NTSC 90% has been released until recently. In addition, an organic light-emitting diode (OLED) which receives much attention as a next-generation display, may attain up to NTSC 100%. However, an LCD TV may attain the level of NTSC 72%.

Accordingly, there is a need to develop an LCD with enhanced color gamut to solve such limitations of the LCD and to activate the depressed display market.

SUMMARY

Technical Problem

Thus, an object of the present invention is to provide a film which may improve an enhancement of color gamut of the liquid crystal display by transmitting pure RGB wavelengths emitted from a light source as much as possible and blocking unnecessary wavelengths other than the RGB wavelengths, and a liquid crystal display comprising same.

Solution to Problem

To achieve the above objects, the present invention provides a liquid crystal display comprising a backlight unit, and a liquid crystal panel, wherein the backlight unit, the liquid crystal panel, or both of the backlight unit and the liquid crystal panel comprise a coating layer or an adhesive layer in configurations thereof, wherein the coating layer or the adhesive layer is a color gamut enhancing film which comprises at least one type of a dye configured to absorb a specific wavelength band.

In addition, the present invention provides a color gamut enhancing film for a liquid crystal display, comprising a pressure-sensitive adhesive and an adhesive layer including at least one type of a dye configured to absorb a specific wavelength band.

In addition, the present invention also provides a color gamut enhancing film for a liquid crystal display, comprising a binder resin and a coating layer including at least one type of a dye configured to absorb a specific wavelength band.

Advantageous Effects of Invention

According to the present invention, by using a color gamut enhancing film for a liquid crystal display, which is formed by introducing a combination of dyes configured to absorb a specific wavelength band into an adhesive layer or a coating layer of a liquid crystal display, a color gamut may be enhanced by transmitting pure RGB wavelengths emitted from a light source as much as possible and blocking unnecessary wavelengths other than the RGB wavelengths, and thus, a liquid crystal display may be manufactured in which the enhancement of the color gamut is improved. In addition, the color gamut enhancing film according to the present invention may maximize color gamut enhancing effect by freely moving the position thereof according to the characteristics of a display.

BRIEF DESCRIPTION OF DRAWINGS

The above-described and other objects and features of the present invention will become apparent from the following explanation on the present invention with reference to attached drawings.

DETAILED DESCRIPTION

A liquid crystal display of the present invention includes a backlight unit and a liquid crystal panel, wherein the backlight unit, the liquid crystal panel, or both of the backlight unit and the liquid crystal panel include a coating layer or an adhesive layer in configurations thereof, wherein the coating layer or the adhesive layer includes at least one type of a dye configured to absorb a specific wavelength band.

According to the present invention, a color gamut of a liquid crystal display may be enhanced by controlling the light transmittance of the adhesive layer or the coating layer and by absorbing unnecessary wavelengths other than pure RGB wavelengths from a light source by disposing the combination of at least one dye configured to selectively absorb a specific wavelength band.

Figure 1:
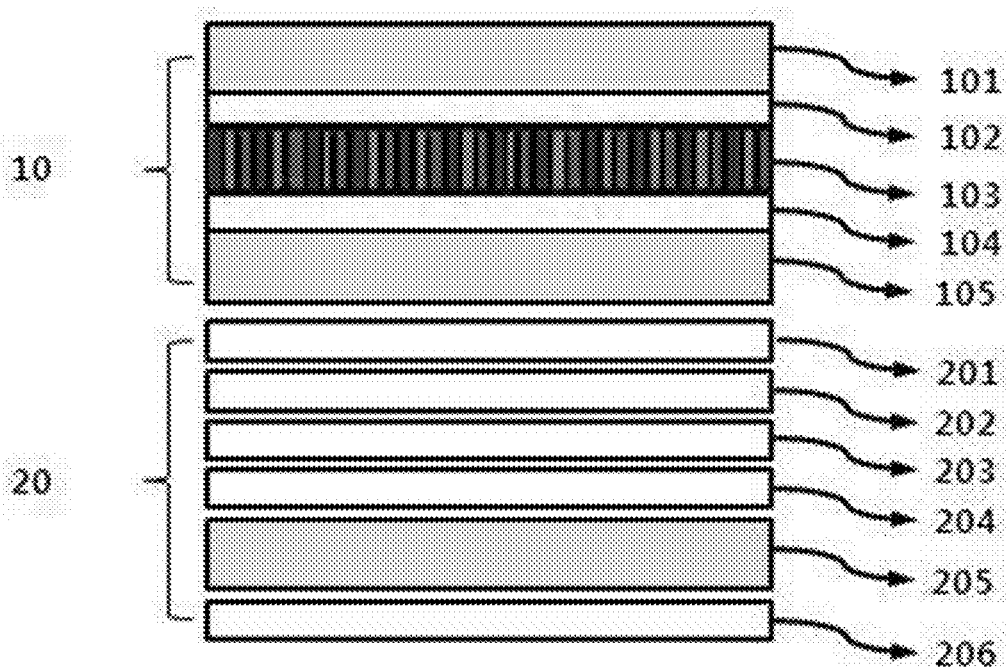
FIG. 1 is a schematic view illustrating a structure of a general liquid crystal display.

A structure of a general liquid crystal display is illustrated in FIG. 1.

Referring to FIG. 1, a liquid crystal panel 10 may include an upper polarizing plate 101, a first adhesive layer 102, a liquid crystal cell 103, a second adhesive layer 104, and a lower polarizing plate 105 in a sequentially stacked form, and a backlight unit 20 may sequentially include a dual brightness enhancement film (DBEF) or an upper diffusion plate 201, a horizontal prism sheet 202, a vertical prism sheet 203, a lower diffusion plate 204, a light guide plate 205, and a reflective plate 206. However, the liquid crystal display of the present invention is not limited thereto, and various modifications may be possible according to the need.

When the basic principle of a liquid crystal display is examined, while light emitted from a light source is guided in a direction of a liquid crystal panel through a light guide plate and then passes through a light diffusion plate, the light is diffused in a horizontal/vertical directions with respect to the surface thereof, thereby rapidly decreasing light luminance. Since outgoing of the light from the light diffusion plate in a direction other than a front light exit surface is prevented by passing the light through a prism sheet and light directivity is improved to narrow a viewing angle, brightness in a direction of the front light exit surface of backlight is increased. In this case, since a separate sheet, such as a dual brightness enhancement film, is used in a backlight unit, the increase in the brightness may be maximized by light recycling.

According to the present invention, the backlight unit, the liquid crystal panel, or both of the backlight unit and the liquid crystal panel include a coating layer or an adhesive layer including at least one type of a dye configured to absorb a specific wavelength band in configurations thereof.

For example, the liquid crystal panel may include at least one dye configured to absorb a specific wavelength band in the first adhesive layer, the second adhesive layer, or both thereof, which are configuration layers of the liquid crystal panel. The backlight unit may have a coating layer on at least one position of one side or both sides of the dual brightness enhancement film or the upper diffusion plate, one side or both sides of the horizontal prism sheet, one side or both sides of the vertical prism sheet, one side or both sides of the lower diffusion plate, and one side of the reflective plate (i.e., light guide plate facing side), wherein the coating layer includes at least one type of a dye configured to absorb a specific wavelength band.

The dye-containing adhesive layer and coating layer are referred to as a color gamut enhancing film, and according to the position of the color gamut enhancing film, particularly, the position of the coating layer, the emission color purity and the brightness loss of a liquid crystal display may change, and thus, the position thereof may be appropriately controlled according to the need.

The dye used in the present invention may be a combination of at least one type of a dye having a main absorption (blocking) wavelength band of 380 to 420 nm, 480 to 510 nm, or 560 to 610 nm.

The dye blocking a wavelength band of 380 nm to 420 nm may include a hydroxy benzotriazole (HB)-based dye, a tris-resorcinol-triazine chromophore (TRTC)-based dye, and a hydroxylphenyl-benzotriazole chromophore (HBC)-based dye; the dye blocking a wavelength band of 480 nm to 510 nm may include a pyrrole methine (PM)-based dye, a rhodamine (RH)-based dye, and a boron dipyrromethene (BODIBY)-based dye; and the dye blocking a wavelength band of 560 nm to 610 nm may include a tetraaza porphyrin (TAP)-based dye, a rhodamine-based dye, a squarine (SQ)-based dye, and a cyanine (CY)-based dye.

Preferably, a combination of at least two dyes selected from the group consisting of a hydroxy benzotriazole-based dye, a pyrrole methine-based dye, a rhodamine-based dye, a cyanine-based dye, and a tetraaza porphyrin-based dye may be used, and more preferably, a combination of a hydroxy benzotriazole-based dye, a cyanine-based dye, and a tetraaza porphyrin-based dye may be used.

Accordingly, the present invention provides a color gamut enhancing film for a liquid crystal display, wherein the film is composed of a pressure-sensitive adhesive and an adhesive layer including at least one type of a dye configured to absorb a specific wavelength band.

In addition, the present invention provides a color gamut enhancing film for a liquid crystal display, wherein the film is composed of a binder resin and a coating layer including at least one type of a dye configured to absorb a specific wavelength band.

The dye may be included in an amount of 0.01 wt % to 10 wt %, and specifically, in an amount of 0.05 wt % to 7 wt % based on a total weight of the coating layer or the adhesive layer.

Examples of the pressure-sensitive adhesive used in the adhesive layer (first adhesive layer and second adhesive layer) may include at least one adhesive selected from the group consisting of an acryl-based adhesive, a urethane-based adhesive, an epoxy-based adhesive, and a silicone-based adhesive. Specifically, the pressure-sensitive adhesive may be an acryl-based adhesive. For example, the adhesive layer may be formed by being wet coated on the one side or both sides of the upper polarizing plate and the lower polarizing plate, and the thickness of the adhesive layer may be in a range of 2 μm to 100 μm, 5 μm to 100 μm, and preferably, 15 μm to 25 μm.

Examples of the binder resin used in the coating layer may include at least one resin selected from the group consisting of a polyester-based binder resin, an acryl-based binder resin, a polyurethane-based binder resin, a melamine-based binder resin, a polyvinyl alcohol-based binder resin, and an oxazoline-based binder resin. Specifically, the binder resin may be an acryl-based binder resin. For example, the coating layer may be formed by being wet coated on one side or both sides of the dual brightness enhancement film or the upper diffusion plate, one side or both sides of the horizontal prism sheet, one side or both sides of the vertical prism sheet, one side or both sides of the lower diffusion plate, and one side of the reflective plate (i.e., light guide plate facing side) and the thickness of the coating layer may be in a range of 1 μm to 100 μm, 2 μm to 100 μm, and preferably, 2 μm to 10 μm.

The adhesive layer and the coating layer may further include an ultraviolet screening agent for screening UV light according to the need. The ultraviolet screening agent absorbs (blocks) light having a wavelength of 420 nm or less, and, for example, a hydroxy benzotriazole (HB)-based dye, a tris-resorcinol-triazine chromophore (TRTC)-based dye, or a hydroxylphenyl-benzotriazole chromophore (HBC)-based dye may be used alone or in a mixture of two or more thereof. The adhesive layer and the coating layer may include the ultraviolet screening agent in an amount of 0.01 wt % to 10 wt % or 0.05 wt % to 7 wt % based on the total weight of the coating layer or the adhesive layer.

Light transmittance of the color gamut enhancing film according to the present invention may be adjusted according to a brightness range of the liquid crystal display, but, specifically, the color gamut enhancing film may have a visible light transmittance of 90% to 30%, and preferably, 90% to 50%.

Component layers of each of the backlight unit and the liquid crystal panel constituting the liquid crystal display of the present invention may have a material, a thickness, and a shape, which are commonly accepted in the art, and may be variously modified if necessary.

Thus, the liquid crystal display including the color gamut enhancing film of the present invention may provide enhanced color gamut and brightness by blocking unnecessary wavelengths other than the RGB wavelengths while transmitting the pure RGB wavelengths emitted from a light source as much as possible, and may maximize a color gamut enhancing effect depending on display characteristics by freely moving the position of the color gamut enhancing film.

EXAMPLE

Hereinafter, the present invention is explained in more detail by examples. The following examples are intended to further illustrate the present invention without limiting its scope.

Example 1-1

30 wt % of 1811L manufactured by Soken, as a pressure-sensitive adhesive, and 70 wt % of methyl ethyl ketone (MEK) were mixed to prepare an adhesive solution, and a dye, SK-d593 manufactured by SK Chemicals was then added thereto in an amount of 0.01 parts by weight based on 100 parts by weight of the adhesive solution to prepare an adhesive layer composition.

Figure 2A:
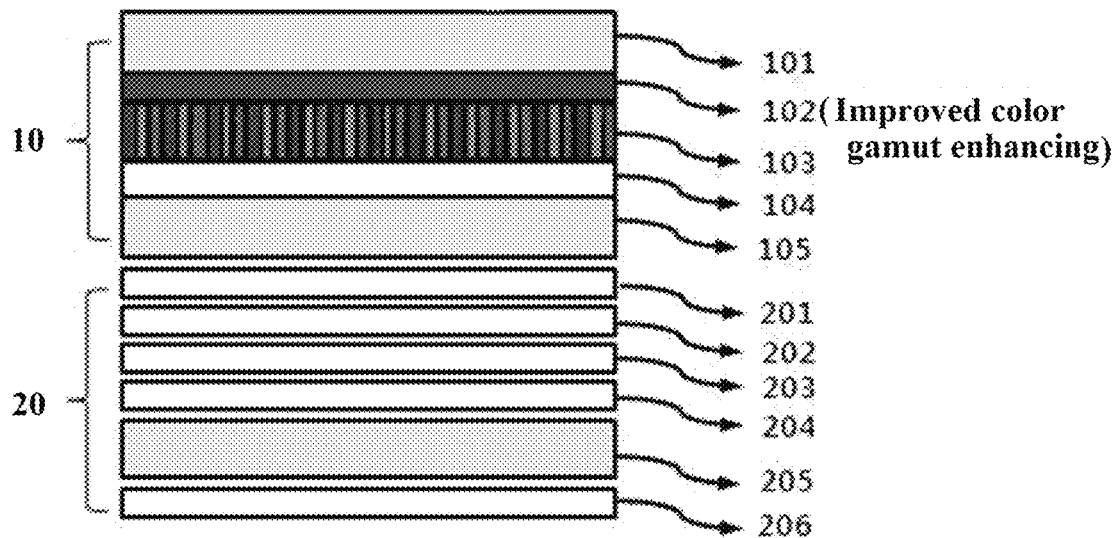
FIGS. 2A through 2D are schematic views respectively illustrating structures of liquid crystal displays according to Examples 1-1, 1-2, 1-3 and 3-1.

One surface of a polarizing film was coated with the adhesive layer composition by using a gap coater and dried and cured to form a 25 μm thick adhesive layer (color gamut enhancing film). The polarizing film having the adhesive layer formed thereon was used as an upper polarizing plate and was introduced into a commercially available liquid crystal display (using upper diffusion plate in a backlight unit) so that the adhesive layer was positioned between the upper polarizing plate and a liquid crystal cell to manufacture a liquid crystal display of the present invention (see FIG. 2A).

Example 1-2

Figure 2B:
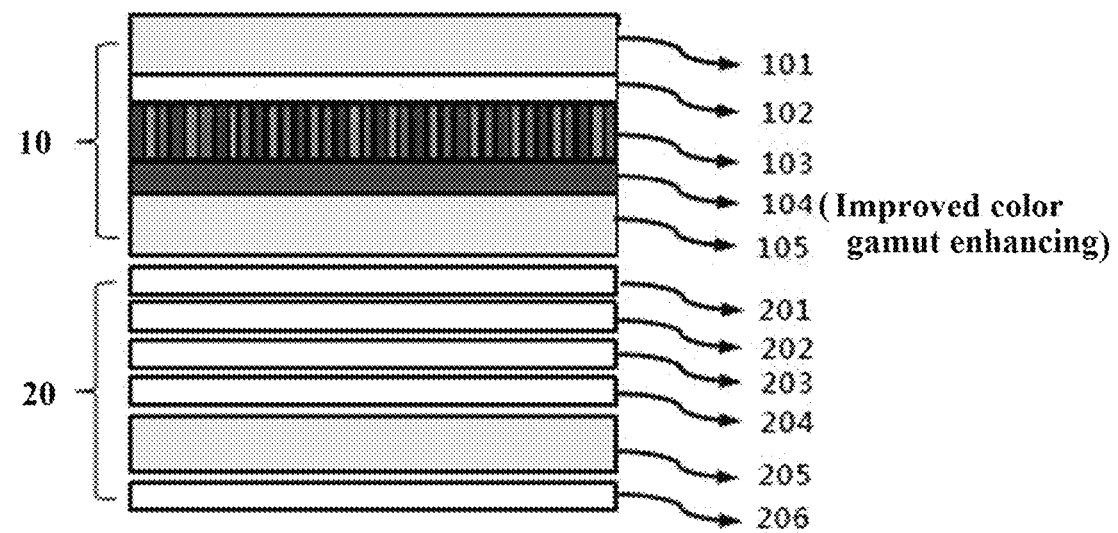

A liquid crystal display of the present invention was manufactured by conducting the same procedure described in Example 1-1 except for using a polarizing film having an adhesive layer formed thereon as a lower polarizing plate and introducing thereof into a commercially available liquid crystal display so that the adhesive layer was positioned between the lower polarizing plate and a liquid crystal cell (see FIG. 2B).

Example 1-3

25 wt % of GS1000 manufactured by Soken, as an acryl binder resin, and 75 wt % of methyl ethyl ketone (MEK) were mixed to prepare a solution, and a dye, SK-d593 manufactured by SK Chemicals was then added thereto in an amount of 0.05 parts by weight based on 100 parts by weight of the solution to prepare a coating layer composition.

Figure 2C:
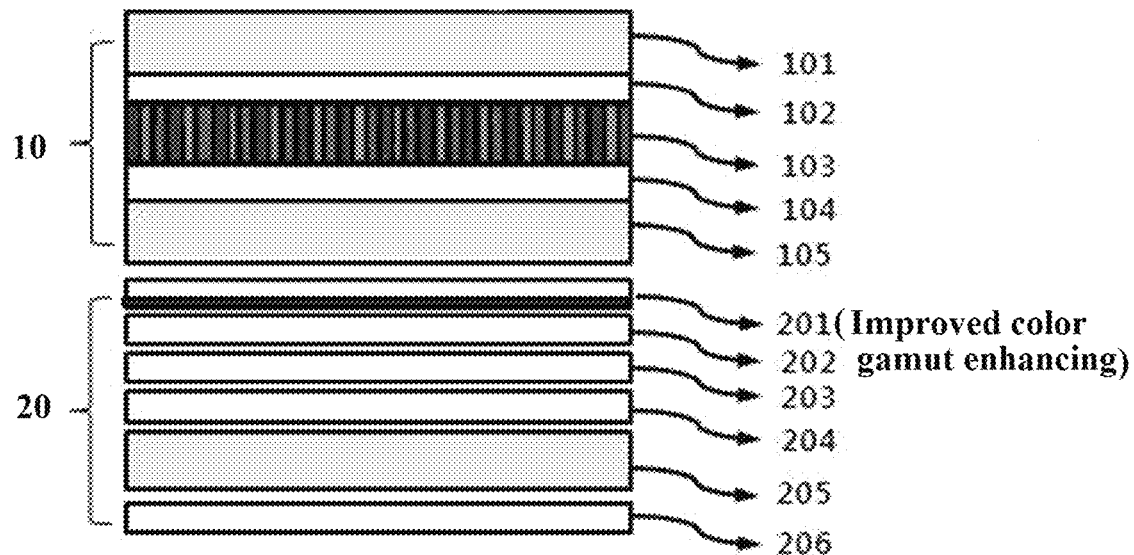

One surface of a diffusion film was coated with the coating layer composition using a mayer bar and dried and cured to form a 5 μm thick coating layer (color gamut enhancing film). The diffusion film having the coating layer formed thereon was used as an upper diffusion plate and was introduced into a commercially available liquid crystal display so that the coating layer was positioned to face a horizontal prism sheet to manufacture a liquid crystal display of the present invention (see FIG. 2C).

Comparative Example 1

A liquid crystal display having the same structure as that of Example 1-1 (commercially available liquid crystal display without changing the structure thereof) was manufactured except that a dye was not used during forming an adhesive layer.

Example 2-1

A liquid crystal display of the present invention was manufactured by conducting the same procedure described in Example 1-1 except for using a dual brightness enhancement film (DBEF) instead of the upper diffusion plate in the backlight unit.

Example 2-2

A liquid crystal display of the present invention was manufactured by conducting the same procedure described in Example 1-2 except for using a dual brightness enhancement film (DBEF) instead of the upper diffusion plate in the backlight unit.

Comparative Example 2

A liquid crystal display having the same structure as that of Example 2-1 (commercially available liquid crystal display without changing the structure thereof) was manufactured except that a dye was not used during forming an adhesive layer.

Example 3-1

Figure 2D:
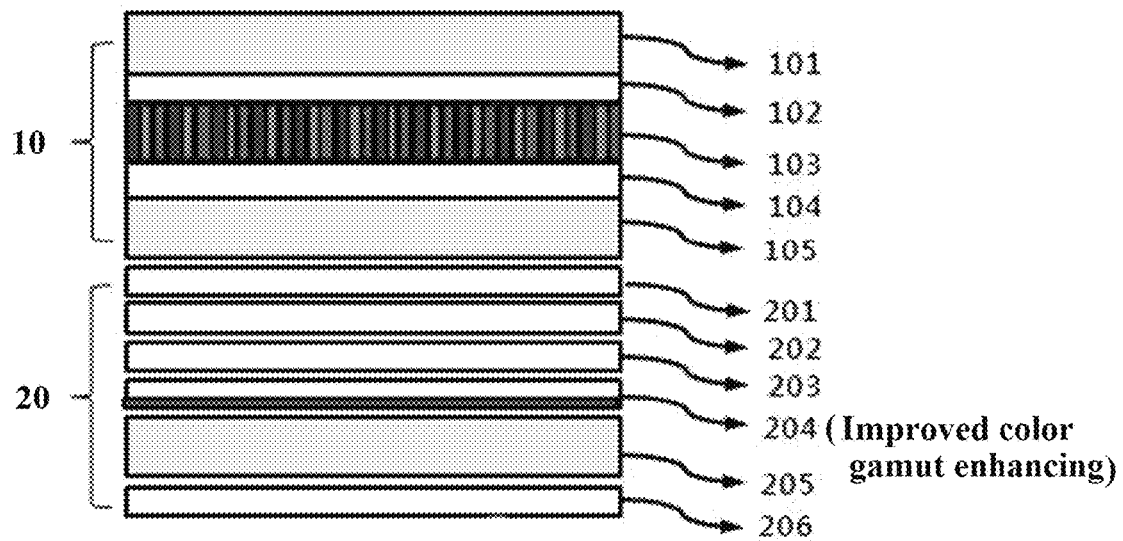
Figure 3A:
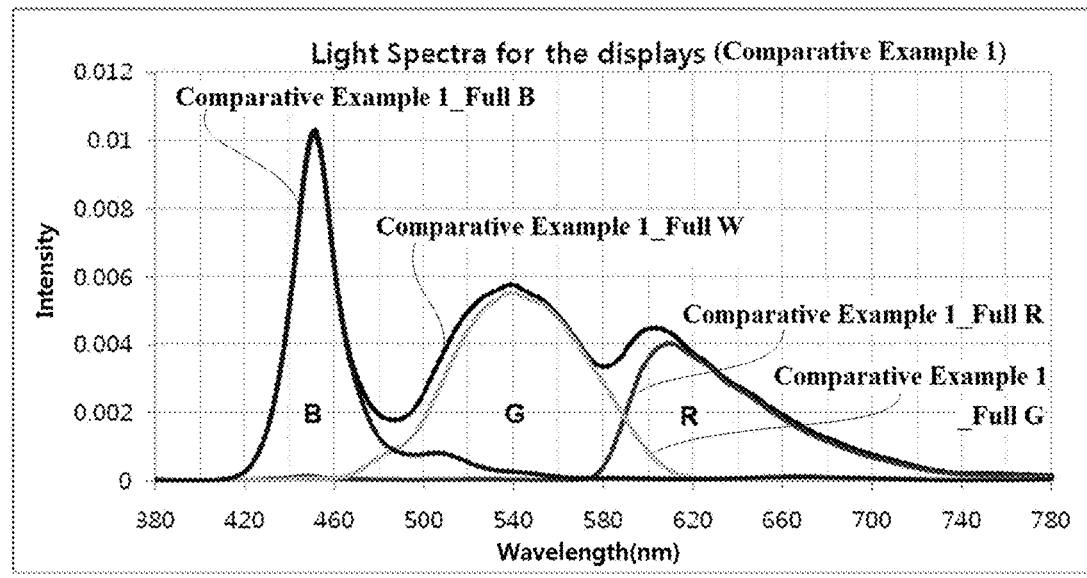
FIGS. 3A through 3D respectively illustrate emission intensity change of liquid crystal displays according to Comparative Example 1 and Examples 1-1, 1-2 and 1-3.
Figure 3B:
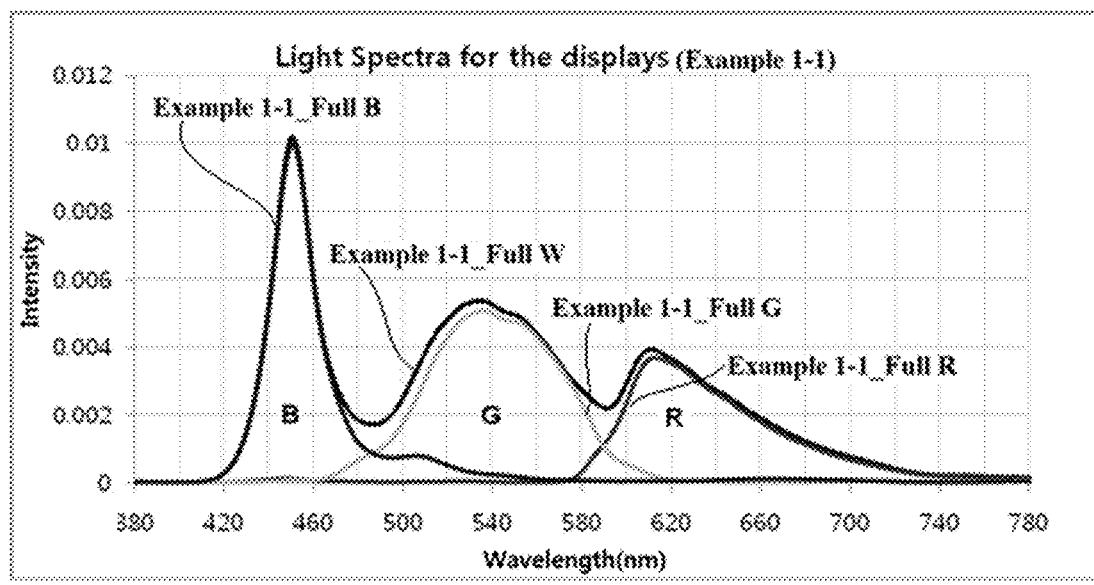
Figure 3C:
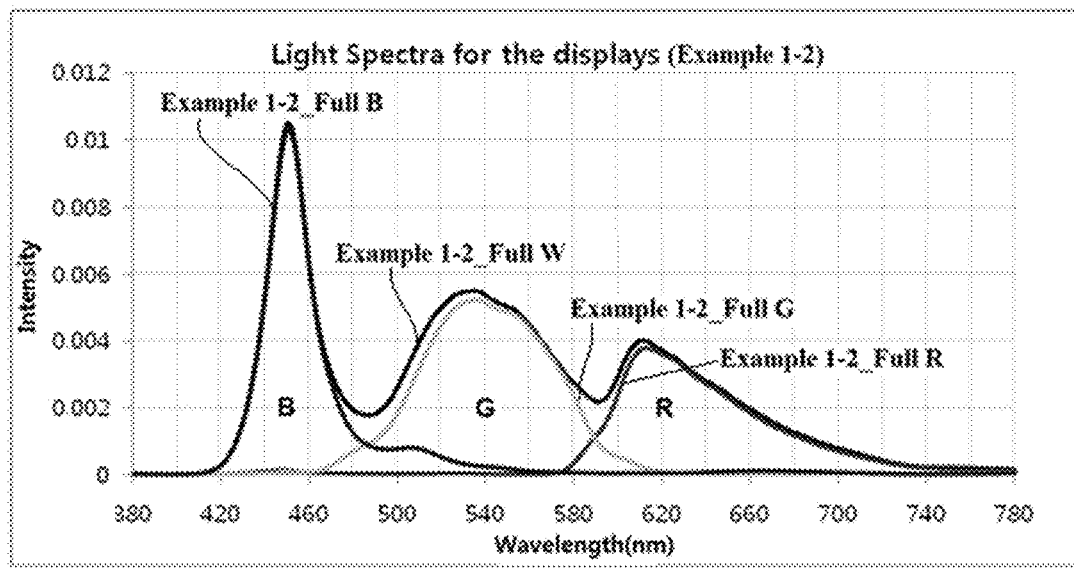
Figure 3D:
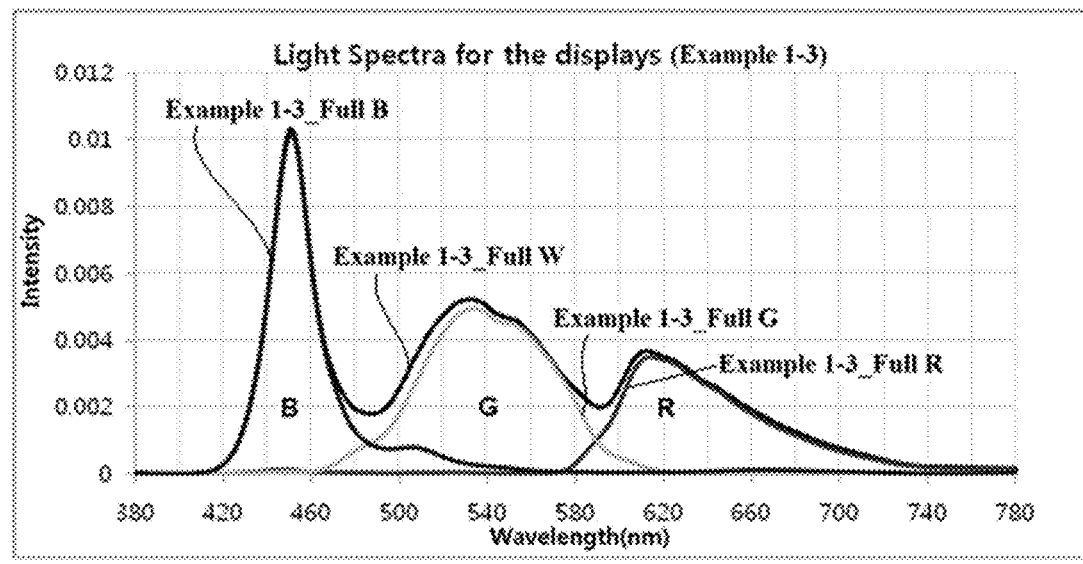

A liquid crystal display of the present invention was manufactured by conducting the same procedure described in Example 1-3 except for using a diffusion film having a coating layer formed thereon as a lower diffusion plate, and introducing thereof so that the coating layer was positioned so as to face a light guide plate (see FIG. 2D).

Experimental Example

Characteristics and changes in spectrum were measured for the liquid crystal displays manufactured in the examples and comparative examples by using a radiometer (CS-2000, Minolta Co., Ltd.) and the results thereof are presented in Tables 1 to 3.

Figure 4A:
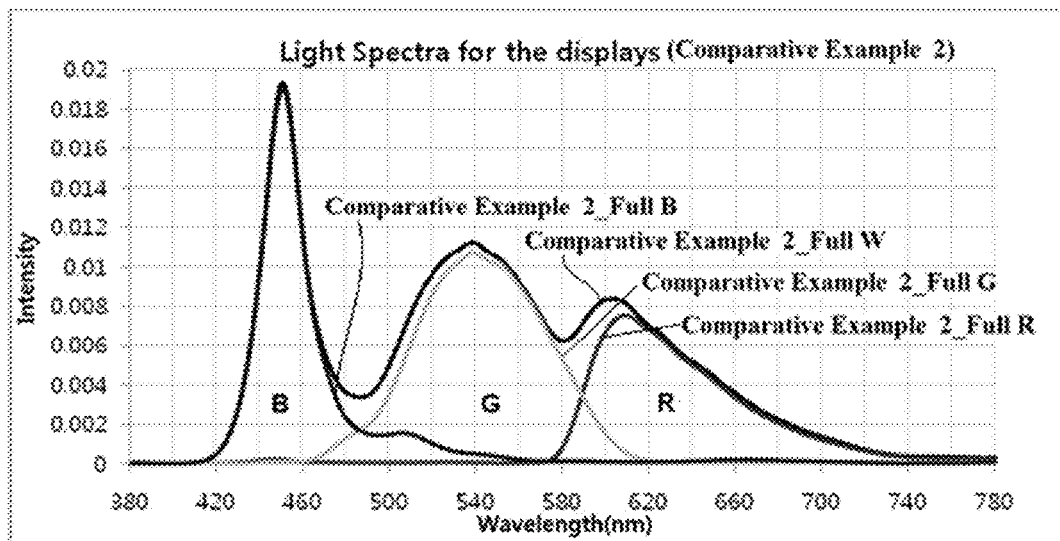
FIGS. 4A through 4C respectively illustrate emission intensity change of liquid crystal displays according to Comparative Example 2 and Examples 2-1 and 2-2.
Figure 4B:
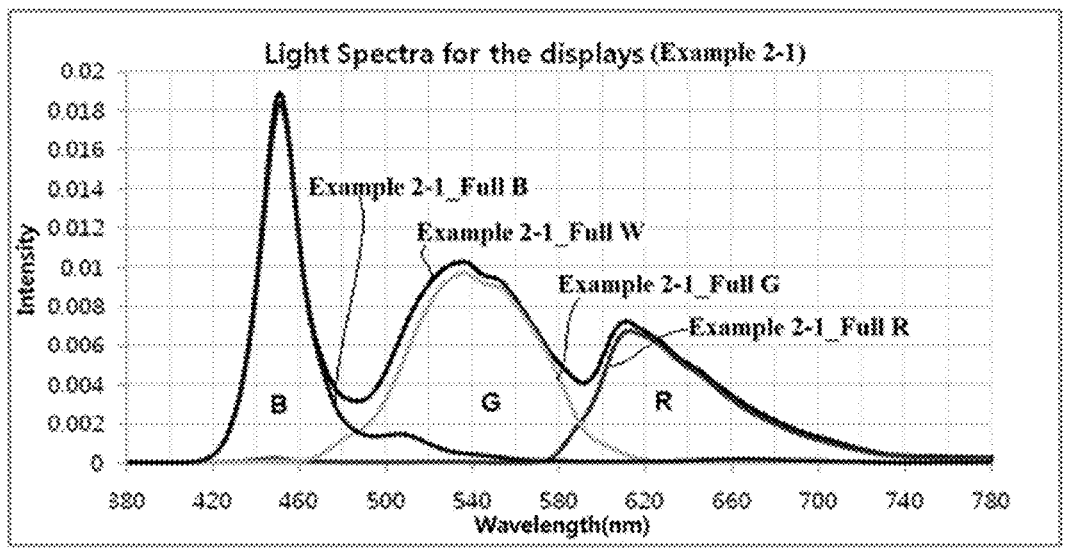
Figure 4C:
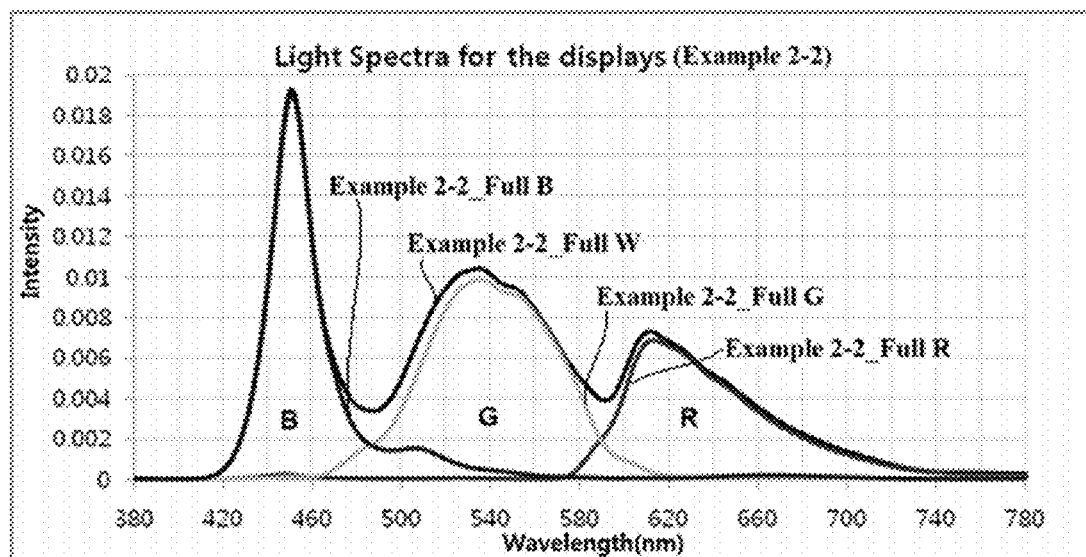
Figure 5A:
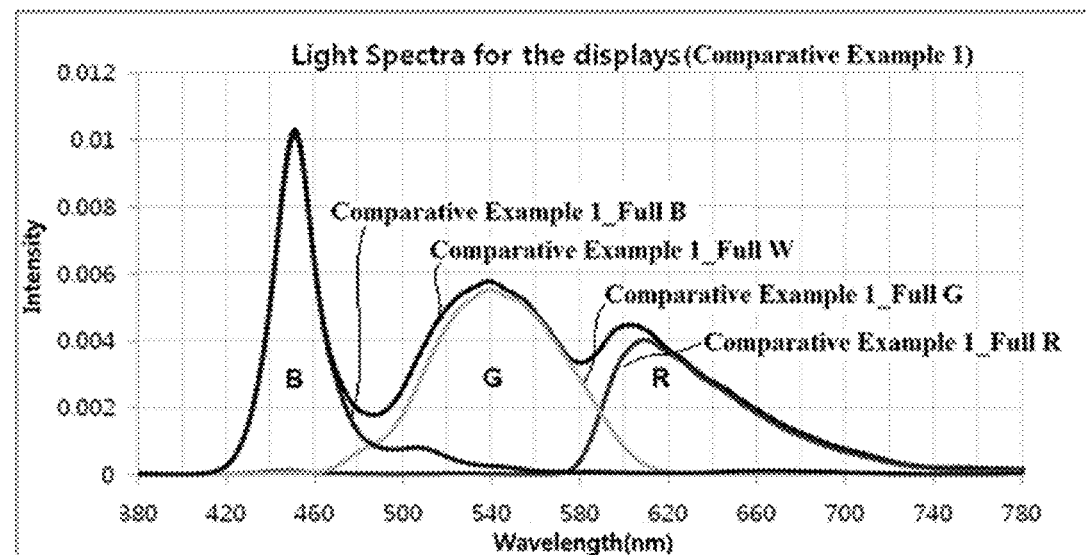
FIGS. 5A through 5C respectively illustrate emission intensity change of liquid crystal displays according to Comparative Example 1 and Examples 1-3 and 3-1.
Figure 5B:
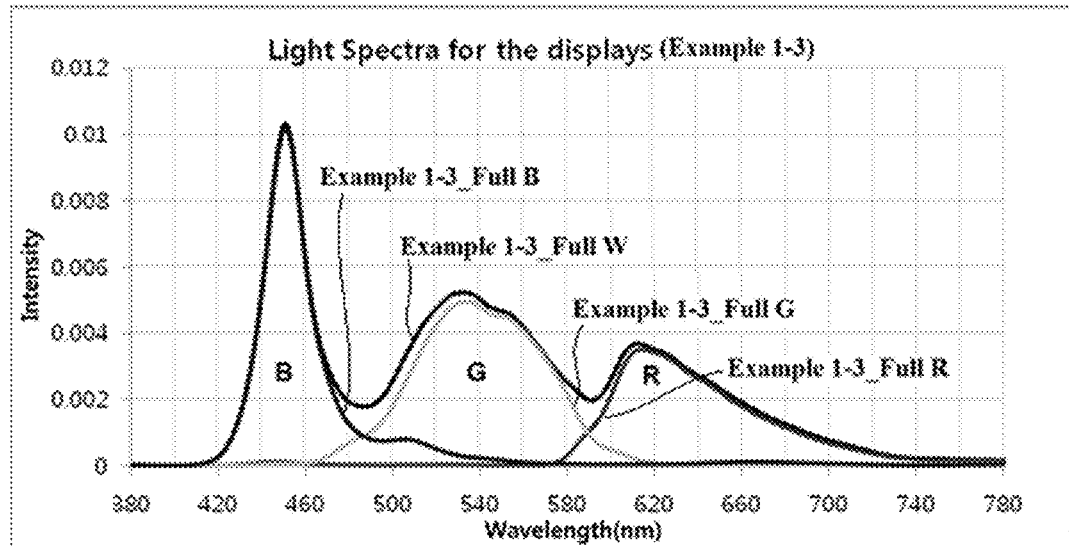
Figure 5C:
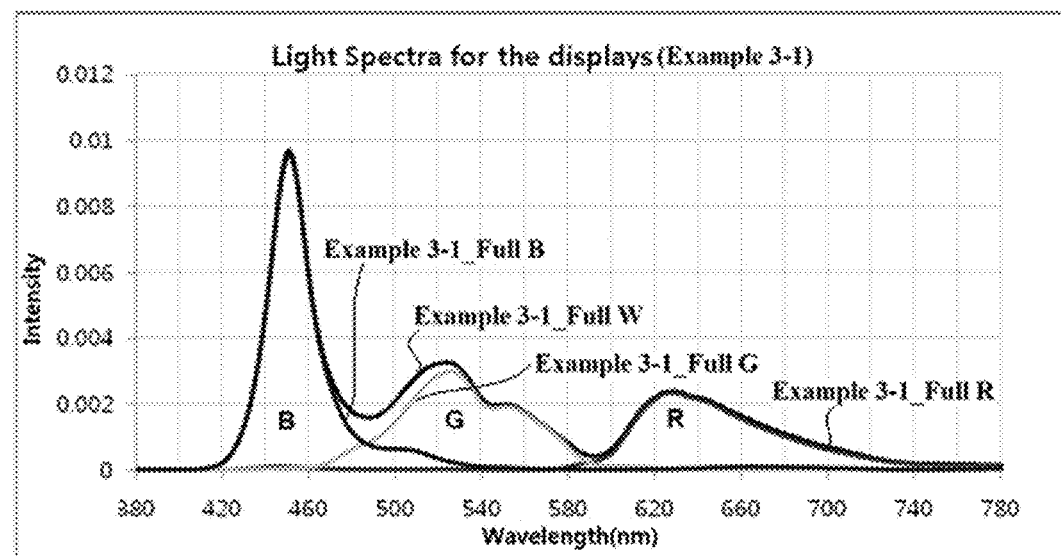

In addition, the change of the emission intensity of the liquid crystal displays of Comparative Example 1, and Examples 1-1, 1-2 and 1-3 are illustrated in FIGS. 3A to 3D, respectively, the change of the emission intensity of the liquid crystal displays of Comparative Example 2, and Examples 2-1 and 2-2 are illustrated in FIGS. 4A to 4C, and the change of the emission intensity of the liquid crystal displays of Comparative Example 1, and Examples 1-3 and 3-1 are illustrated in FIGS. 5A to 5C. A color gamut indicates a color reproduction area.

TABLE 1

|  |  | Comparative Example 1 | Example 1-1 | Example 1-2 | Example 1-3 |
|---|---|---|---|---|---|
| Full W | Lv | 317.6 | 278.6 | 287.4 | 269.8 |
|  | x | 0.3136 | 0.2994 | 0.2971 | 0.2923 |
|  | y | 0.3352 | 0.3256 | 0.3233 | 0.3173 |
| Full R | Lv | 64.74 | 52.78 | 53.32 | 49.38 |
|  | x | 0.6415 | 0.6475 | 0.6471 | 0.6481 |
|  | y | 0.3381 | 0.3289 | 0.3279 | 0.3265 |
| Full G | Lv | 228.9 | 206.1 | 210.2 | 197.6 |
|  | x | 0.3111 | 0.2971 | 0.2954 | 0.2922 |
|  | y | 0.6249 | 0.6333 | 0.6337 | 0.6345 |
| Full B | Lv | 24.98 | 23.62 | 24.39 | 23.67 |
|  | x | 0.1557 | 0.1549 | 0.1547 | 0.1543 |
|  | y | 0.0637 | 0.0619 | 0.0616 | 0.0607 |
| Color gamut | Color gamut | 0.115 | 0.122 | 0.122 | 0.123 |
|  | Against ATSC | 102.6% | 108.7% | 109.0% | 110.1% |
| Color gamut improvement |  | — | 5.9% | 6.2% | 7.3% |

TABLE 2

|  |  | Comparative Example 2 | Example 2-1 | Example 2-2 |
|---|---|---|---|---|
| Full W | Lv | 605.6 | 531.2 | 536.9 |
|  | x | 0.3128 | 0.2987 | 0.2956 |
|  | y | 0.3389 | 0.3303 | 0.3268 |
| Full R | Lv | 121 | 96.52 | 97.2 |
|  | x | 0.6417 | 0.6474 | 0.6474 |
|  | y | 0.3382 | 0.329 | 0.3277 |
| Full G | Lv | 439.1 | 389.4 | 396 |
|  | x | 0.3095 | 0.2956 | 0.2931 |
|  | y | 0.6269 | 0.6353 | 0.6356 |
| Full B | Lv | 47.49 | 43.97 | 45.71 |
|  | x | 0.1556 | 0.1548 | 0.1544 |
|  | y | 0.0648 | 0.063 | 0.0627 |
| Color gamut | Color gamut | 0.116 | 0.122 | 0.123 |
|  | Against ATSC | 103.2% | 109.1% | 109.6% |
| Color gamut improvement |  | — | 5.8% | 6.3% |

TABLE 3

|  |  | Comparative Example 1 | Example 1-3 | Example 3-1 |
|---|---|---|---|---|
| Full W | Lv | 317.6 | 269.8 | 138.7 |
|  | x | 0.3136 | 0.2923 | 0.2438 |
|  | y | 0.3352 | 0.3173 | 0.2361 |
| Full R | Lv | 64.74 | 49.38 | 24.22 |
|  | x | 0.6415 | 0.6481 | 0.6537 |
|  | y | 0.3381 | 0.3265 | 0.3022 |
| Full G | Lv | 228.9 | 197.6 | 97.18 |
|  | x | 0.3111 | 0.2922 | 0.2433 |
|  | y | 0.6249 | 0.6345 | 0.6539 |
| Full B | Lv | 24.98 | 23.67 | 17.84 |
|  | x | 0.1557 | 0.1543 | 0.1519 |
|  | y | 0.0637 | 0.0607 | 0.05 |

TABLE 3-continued

|  |  | Comparative Example 1 | Example 1-3 | Example 3-1 |
|---|---|---|---|---|
| Color gamut | Color gamut | 0.115 | 0.123 | 0.140 |
|  | Against ATSC | 102.6% | 110.1% | 124.9% |
| Color gamut improvement |  | — | 7.3% | 21.7% |

As illustrated in Tables 1 to 3 and FIGS. 3A to 3D, 4A to 4C and 5A to 5C, it may be understood that the liquid crystal displays of the examples including the color gamut enhancing film provided an improved color gamut and color purity in comparison to the comparative examples.

EXPLANATION OF MARK

10: Liquid crystal panel
101: Upper polarizing plate
102: First adhesive layer
103: Liquid crystal cell
104: Second adhesive layer
105: Lower polarizing plate
20: Backlight unit
201: Dual brightness enhancement film (DBEF) or an upper diffusion plate
202: Horizontal prism sheet
203: Vertical prism sheet
204: Lower diffusion plate
205: Light guide plate
206: Reflective plate

What is claimed is:

1. A liquid crystal display, comprising a backlight unit, and a liquid crystal panel,
wherein the backlight unit, the liquid crystal panel, or both of the backlight unit and the liquid crystal panel comprise a coating layer or an adhesive layer in configurations (a), (b), or both thereof:
(a) the liquid crystal panel sequentially comprises an upper polarizing plate, a first adhesive layer, a liquid crystal cell, a second adhesive layer, and a lower polarizing plate, and wherein the first adhesive layer, the second adhesive layer, or both of the first adhesive layer and the second adhesive layer comprise at least three types of dyes configured to absorb specific wavelength bands;
(b) the backlight unit sequentially comprises a dual brightness enhancement film (DBEF) or an upper diffusion plate, a horizontal prism sheet, a vertical prism sheet, a lower diffusion plate, a light guide plate, and a reflective plate, wherein the backlight unit has a coating layer on at least one position of one side or both sides of the dual brightness enhancement film or the upper diffusion plate, one side or both sides of the horizontal prism sheet, one side or both sides of the vertical prism sheet, one side or both sides of the lower diffusion plate, and one side of the reflective plate, and wherein the coating layer comprises the at least three types of dyes configured to absorb specific wavelength bands;
wherein the at least three types of dyes configured to absorb specific wavelength bands comprise a hydroxyl benzotriazole-based dye having a main absorption wavelength band of 380 to 420 nm, a pyrrole methine-based dye having a main absorption wavelength band of 480 to 510 nm, and a tetraaza porphyrin-based dye having a main absorption wavelength band of 560 to 610 nm.

2. The liquid crystal display of claim 1, wherein the three dyes are included in a total amount of 0.01 wt % to 10 wt % based on a total weight of the coating layer or the adhesive layer.

3. The liquid crystal display of claim 1, wherein the coating layer or the adhesive layer has a thickness of 2 to 100 µm.

4. The liquid crystal display of claim 1, the first adhesive layer and/or the second adhesive layer further comprising a pressure-sensitive adhesive.

5. The liquid crystal display of claim 1, the coating layer further comprising a binder resin.

* * * * *